Aug. 5, 1947.  G. T. ROYDEN  2,425,008
RADIO NAVIGATIONAL APPARATUS
Filed Feb. 3, 1944  2 Sheets-Sheet 1
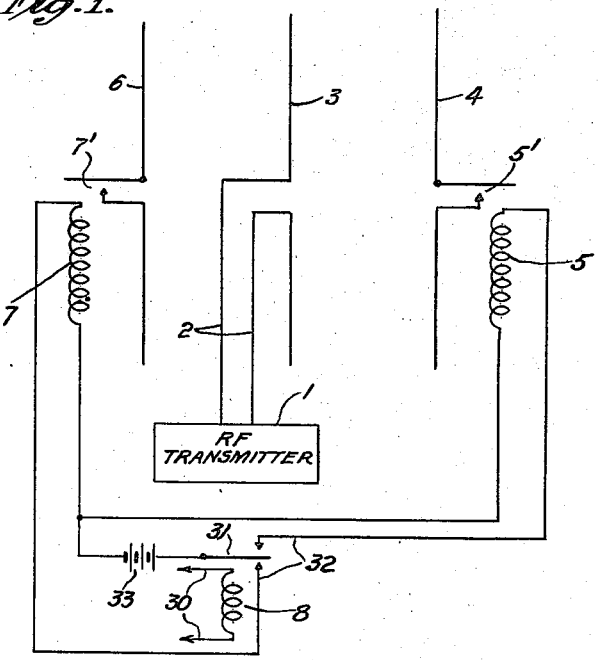
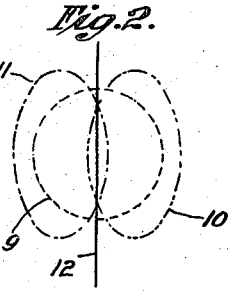
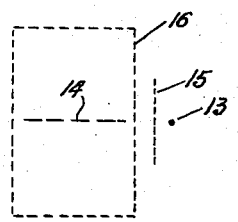
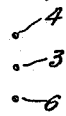
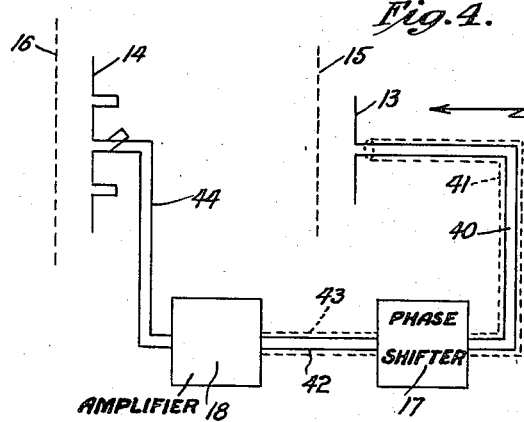
INVENTOR.
GEORGE T. ROYDEN
BY
AGENT Aug. 5, 1947.  G. T. ROYDEN  2,425,008
RADIO NAVIGATIONAL APPARATUS
Filed Feb. 3, 1944   2 Sheets-Sheet 2
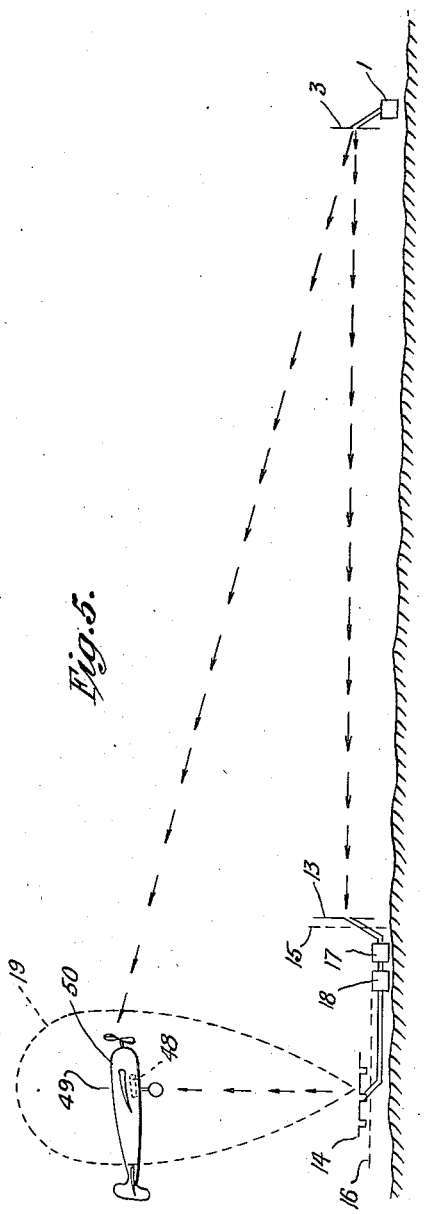
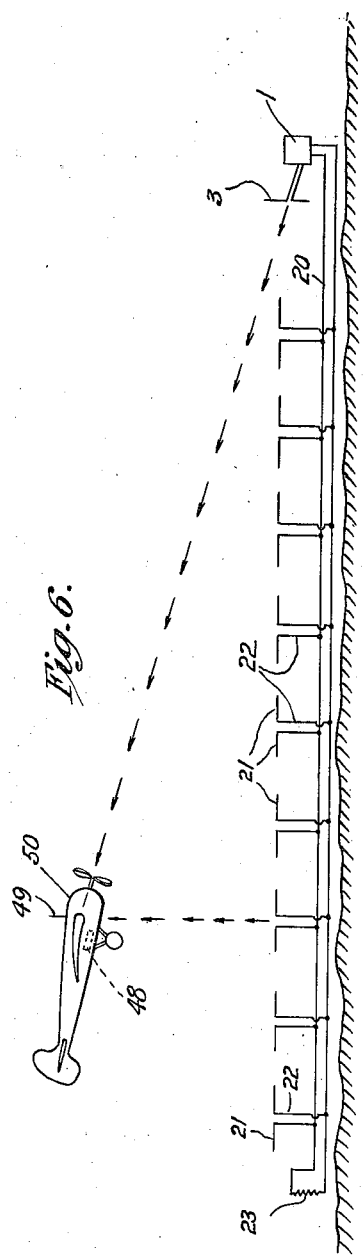
INVENTOR.
GEORGE T. ROYDEN
BY
AGENT Patented Aug. 5, 1947

2,425,008

UNITED STATES PATENT OFFICE 2,425,008

RADIO NAVIGATIONAL APPARATUS

George T. Royden, South Orange, N. J., assignor to Federal Telephone and Radio Corporation, New York, N. Y., a corporation of Delaware Application February 3, 1944, Serial No. 520,856

13 Claims. (Cl. 250—11)

This invention relates to devices utilizing radio energy to transmit signals to a moving vehicle. More particularly it relates to such devices transmitting signals to an aerial vehicle, such as an airplane or dirigible, in order that the altitude and direction of course of such vehicle may be determined from the received signals.

This invention relates especially to a radio localizer, combined with an altitude indicator.

Radio localizers of a type radiating two patterns oriented so as to produce equal field strengths along the desired course of the vehicle are well-known in the art. Such localizers radiate code signals in the form of an interlocked A—N, in such fashion that a dot-dash code signal corresponding to the letter A is heard when the moving vehicle veers to one side of the proper course, while a dash-dot code signal corresponding to the letter N is heard when the vehicle is off course on the other side. When the vehicle is proceeding directly along the desired course, only a steady dash is heard. While this system has been described as employing aural reception, for the sake of simplicity and in order that the receiving equipment, especially on an aerial vehicle, may be kept of minimum size and weight, it is to be understood that visual reception may likewise be employed, utilizing apparatus well-known in the art.

One object of this invention is to combine with a localizer of the type above-described, a device simultaneously transmitting a so-called marker beacon and signals which will indicate the distance of the vehicle from the antenna transmitting such signals, this latter quantity may be the altitude in the case of an aerial vehicle.

Another object of this invention is to provide a combined localizer and altitude indicator, employing frequency modulation and giving a direct indication of the altitude of an airplane or other aerial vehicle, without the necessity of employing elaborate receiving apparatus located upon such vehicle.

A yet further object of this invention is to provide a combination localizer and marker beacon system by means of which an airplane or the like may receive an indication of its altitude each time that it passes over a marker beacon, so that the plane may approach the landing field at a glide angle suitable for landing upon the runway at such field.

Reference is now made to the drawings where:

Fig. 1 is a schematic drawing of a localizer transmitter;

Fig. 2 shows the field intensity pattern yielded by the transmitter of Fig. 1;

Fig. 3 is a schematic plan view showing the radiating portion of the transmitter of Fig. 1 and the receiving and radiating portions of the marker beacon and altitude indicator of this invention;

Fig. 4 is a diagrammatic view of the devices shown in Fig. 3;

Fig. 5 is a partly diagrammatic representation of the system of Figs. 3 and 4, illustrating the method of operation thereof; and Fig. 6 is a partly diagrammatic representation of a variant system employing a plurality of marker beacons and altitude indicators.

Referring now to Fig. 1, there is indicated at, 1, a transmitter yielding a carrier frequency which is frequency modulated with a saw-tooth wave shape at a modulation frequency preferably suitable for aural reception. The output of transmitter 1 is conveyed by a suitable transmission line 2 to a radiating system 3, which last is schematically shown as a dipole antenna.

Fig. 1 also shows one suitable method which may be used to impress the desired interlocking localizer signals upon the radiation pattern afforded by antenna 3. Antenna 4, which is placed at one side of antenna 3, absorbs and re-radiates a portion of the energy from antenna 3 when relay 5 is actuated so as to close contacts 5′, which closure places antenna 4 into substantial resonance with the wave length of the radiation impinging thereupon from antenna 3. Similarly antenna 6 is placed upon the other side of antenna 3 and is controlled by relay 7 and contact 7′. A master relay 8 is actuated by current arriving thereat through leads 30. A movable contact 31 is caused, by the alternate excitation and de-excitation of relay 8, to play between fixed contacts 32. A suitable source of current, here shown as a battery 33 is interpolated between moving armature 31 and one side of each of relays 5 and 7 respectively. The other side of each of these latter relays is connected to a respective one of contacts 32, so that the position of armature 31 upon either one of the fixed contacts 32 will determine the operation of the corresponding antenna relay. Relay 8 is operated in the manner above-described and well-known in the art, so that interlocking A—N signals are transmitted thereby to antenna relays 5 and 7 and thence to antennas 4 and 6.

Referring now additionally to Fig. 2, it can be seen that the normally circular radiation pattern 9, produced by antenna 3, alone, is distorted by the respective re-radiation from antennas 4 or 6 to form the combined signal patterns shown respectively at 10 and 11, these patterns being formed alternately, depending on which of the relays 5' and 7' is operated at the particular instant. The line 12 indicates the equisignal zone in which the steady dash from the A on one side and N on the other is heard.

Referring now additionally to Fig. 3, antennas 3, 4 and 6 are shown at the right, and at the left, separated from these antennae, is shown the antennas for the altitude indicator. The distance between these elements may be varied in accordance with the requirements of any particular type of service.

Referring now additionally to Fig. 4, a receiving antenna 13 is located in the plane of the equisignal zone from antennas 3, 4 and 6. A radiating antenna system 14 is likewise in the same plane, but is at a greater distance from antenna 3 than is antenna 13. A reflector 15, functioning together with antenna 13 serves to prevent radiation coupling between antennas 13 and 14. Antenna 14 is preferably provided with a counterpoise 16 serving to direct radiation upward and likewise to provide a uniform ground plane for the antenna system 14.

The operation of the system just described is as follows. Receiving antenna 13 collects energy radiated from transmitting antenna 3 and passes this energy through a suitable transmission line 40 enclosed in suitable shielding 41, to a phase shifting device 17. This last device may be of any suitable type, for example, an artificial line, as well-known in the art. From phase shifter 17 another transmission line 42, with shielding 43, conveys the energy to an amplifier 18, which amplifier raises the energy level sufficiently to give the desired amount of radiation from antenna 14, this antenna being fed from amplifier 18 via another suitable transmission line 44. Antenna system 14 is preferably designed to radiate a fan-shaped pattern having the narrow dimension along the beam or in the plane of the equisignal zone so as to provide a comparatively sharply defined indication of location, when the vehicle passes directly through the radiation field produced by antenna 14.

Referring now additionally to Fig. 5, in which the major elements of the system of Figs. 3 and 4 are indicated by corresponding reference numerals, there is here additionally shown an airplane 50, passing above antenna 14, which antenna yields a radiation pattern indicated schematically at 19. The antenna 49 connected to receiver 48 on plane 50, if the latter be flying substantially on course, will pick up energy radiated from antenna 3 and likewise energy from antenna 14, when the plane has entered field 19, radiated from the latter antenna. If the distance between antenna 3 and antenna 13 be great in comparison with the altitude of plane 50 over antenna 14, then the transit time for energy radiated from antenna 3 to plane 50 will be substantially equal to the transmit time from antenna 3 to antenna 14, it being assumed that artificial line 17 is adjusted to substantially compensate for the difference between the transit time from antenna 13 through transmission lines 40, 42 and 44, and amplifier 18, to antenna 14 and the transit time between antenna 13 and antenna 14. Therefore the difference between the transit time of energy arriving at plane 50 directly from antenna 3 and that of energy arriving at the plane via antenna 14 will be approximately proportional to the height of the plane above antenna 14.

The altitude of plane 50 may be determined as follows. Due to the saw-tooth frequency modulation of the original transmitter, the transmitter frequency will have altered to a different frequency, compared with the frequency received at a given instant directly from transmitter 3 at the plane, during the additional time required for energy to travel from antenna 14 to the plane. It is understood that phase shift device 17 is adjusted so that there will be a predetermined frequency difference at antenna 14, corresponding to its height above ground. From this frequency difference found at plane 50, between the signals arriving directly from antenna 3 and those received from antenna 14, may be derived the altitude of the plane, by means well-known in the art, since such difference will be proportional to the altitude of the plane or will bear a known relation thereto.

From the foregoing description it can be seen that this invention provides a system which functions simultaneously as a radiator localizer, a fan marker and an altitude indicator. It can readily be seen that if a series of fan marker beacon devices, similar to that just described, be placed in line along an airport runway, a plane can easily be guided at the proper angle to glide to secure a safe landing, since each successive marker beacon encountered will indicate to the plane pilot a definite height above ground, from which successive heights he may readily deduce the glide angle desired.

Instead of employing a receiving antenna 13, picking up direct radiation from antenna 3, there may be substituted a transmission line extending from transmitter 1 to amplifier 18. Under such conditions, phase shifting device 17 would necessarily incorporate phase advancing characteristics, in order to compensate for phase delay taking place in such transmission line.

The antenna 14 and associated circuits, whether the antenna receives its energy from the receiving antenna 13 or direct by wire from the transmitter 1, constitute a second or relay transmitter, and the term "relay transmitter" in the claims is intended to signify any arrangement for radiating the same signal as radiated from antenna 3.

Referring now to Fig. 6, there is here shown a transmission line 20 extending from transmitter 1 along the landing course at an aviation field. Located preferably equidistantly, along this transmission line, are situated a number of antennae 21, 21. Each one of these antennae may be similar to antenna 14 previously described, and all these antennae are connected by respective impedance changing networks 22, to transmission line 20. It is desirable that transmission line 20 be terminated by a suitable resistor 23 in order to minimize reflection and standing waves on the line, as known in the art. If transmission line 20 be of comparatively great length, it may also be necessary to insert therein, at intervals, phase corrective networks, in order to compensate for the retarded velocity of wave propagation along such line, in comparison with the free space propagation of the radiation received by plane 50 directly from antenna 3.

The operation of the system shown in Fig. 6 is substantially identical, mutatis mutandis, with the operation just described for a system employing a number of elements, each arranged as shown in Fig. 5, and located in a line along the desired course, so that a detailed repetition of this mode of operation would be superfluous.

While frequency modulation of the carrier in the form of a saw-tooth wave form has been disclosed, other modulation methods may be used as long as these permit measurement of transit time.

What is claimed is:

1. Combination radio localizer and marker beacon system, including a prime transmitter for sending out signals constituting a direction localizer beam, whereby a moving receiver may be oriented, a relay transmitter located at a point distant from said prime transmitter, along the path defined by said localizer beam, transmission means coupling said relay transmitter to said prime transmitter and arranged so that the signals radiated from said prime transmitter will have a predetermined time relation to those radiated from said relay transmitter, said relay transmitter being arranged to re-radiate said localizer beam signals in a marker beacon pattern across the path defined by said localizer beam whereby said receiver can receive said re-radiated beam signal when within said beacon pattern area.

2. System according to claim 1, in which said prime transmitter is frequency modulated and said relay transmitter re-radiates a signal having a predetermined phase relation with the signal received thereat, whereby said moving receiver receives said re-radiated beacon signal with a frequency difference from the directly received localizer beam signal which bears a definite relation to the distance between said receiver and said relay transmitter, thereby allowing said distance to be derived from said frequency difference.

3. System according to claim 1, in which said prime transmitter is frequency modulated and said prime and relay transmitters are coupled to one another by a path carrying free space radiated signal energy, whereby the localizer beam arrives at said moving receiver and said relay transmitter at substantially the same instant, when said receiver is located in the zone of radiation of said re-radiated beacon signal and distant from said relay transmitter by only a small fraction of the length of said free space signal path.

4. System according to claim 1, also including a phasing device located in said relay transmitter, between the receptor and emitter elements thereof, whereby the phase of said re-radiated beacon signal may be made to have substantially zero frequency difference from said localizer beam as received at said relay transmitter.

5. System according to claim 1, in which said transmission means comprises a physical transmission line coupling said prime and relay transmitters.

6. System according to claim 1, in which a plurality of relay transmitters are located at intervals along the path defined by said localizer beam, whereby said receiver receives marker beacon signals at intervals when passing along said path.

7. Combined radio localizer, marker beacon and altitude indicator system, including a frequency modulated prime transmitter for sending out signals constituting a direction localizer beam, first transmission means coupling said transmitter and a moving receiver, whereby said receiver may be oriented, a relay transmitter located at a point distant from said prime transmitter, along the path defined by said localizer beam, second transmission means coupling said relay transmitter to said prime transmitter, means causing said relay transmitter to re-radiate across said path defined by said localizer beam a fan-shaped marker beacon pattern of said localizer beam signals, whereby said moving receiver can receive said re-radiated beam signal when within said beacon pattern, and means for radiating said beacon signal with a predetermined frequency difference from said localizer beam, as received at said relay transmitter, whereby said moving receiver can indicate the distance thereof from said relay transmitter by measuring the frequency difference between said localizer beam signals and said beacon signals and translating said difference into units of distance.

8. System according to claim 7, in which said second transmission means comprises a physical transmission line and also includes therein a phase corrective network, whereby differences of velocity of propagation between the free space path of said localizer beam and the physical path thereof can be compensated.

9. System according to claim 7, in which a plurality of relay transmitters are located at intervals along the path defined by said localizer beam, whereby said receiver receives marker beacon signals at intervals when passing therealong and also receives distance signals at corresponding intervals.

10. Combined radio localizer, marker beacon and altitude indicator system, including a frequency modulated prime transmitter for sending out signals constituting a direction localizer beam, a receiver located upon a moving airplane, a secondary relay receptor and beacon signal transmitter located at a point removed from said prime transmitter by a distance which is a large multiple of the altitude of said airplane when passing over said secondary transmitter, and receiving and re-radiating said localizer beam signals in a marker beacon pattern, and means for radiating said beacon signals with a predetermined frequency difference from said localizer beam signals as received at said relay receptor, whereby apparatus in said airplane can determine its altitude over said relay transmitter by measuring frequency difference between said localizer beam signals and said beacon signals and translating said difference into units of distance.

11. System according to claim 10, in which said secondary relay receptor and transmitter includes a receiving antenna, a first shielded transmission line extending therefrom, a phase shifter receiving energy from said first shielded line, an amplifier receiving energy from said second shielded line, a radiating antenna fed from said amplifier, and radiation shielding means located between said receiving and said radiating antennae, whereby auto-oscillatory feed-back effects at said secondary relay point are substantially eliminated.

12. System according to claim 10, including a plurality of secondary relay receptors and transmitters and including a physical transmission line extending between said prime transmitter and all said secondary relay receptors, whereby said secondary transmitters are energized directly from said prime transmitter over said physical line.

13. Combined radio localizer, marker beacon and altitude indicator system, including a frequency modulated prime transmitter for sending out a direction localizer beam, a receiver located upon a moving airplane, a secondary relay receptor and beacon signal transmitter located at a point from said prime transmitter by a distance which is a large multiple of the altitude of said airplane when passing over said secondary transmitter, and receiving and re-radiating said localizer beam signals in a marker beacon pattern, and means for radiating said beacon signal across said localizer beam with a predetermined frequency difference from said localizer beam signals as received at said relay transmitter, whereby apparatus on said airplane can determine its altitude over said relay transmitter by measuring frequency difference betwen said localizer beam and said beacon signal, said system including a plurality of said relay receptors and transmitters, a physical transmission line extending between said prime transmitter and all said secondary relay receptors, whereby said secondary transmitters are energized directly from said prime transmitter, phase corrective networks located along said physical line at intervals and adjusted to compensate for retardation of propagation velocity of signals along said line with respect to free space propagation, an impedance changing network between each relay receptor and said physical line, and a surge impedance resistor terminating said physical line.

GEORGE T. ROYDEN.

REFERENCES CITED

The following references are of record in the file of this patent:

FOREIGN PATENTS

| Number | Country | Date |
|---|---|---|
| 115,055 | Australia | Apr. 23, 1942 |
| 115,120 | Australia | May 7, 1942 |
| 811,700 | France | Jan. 23, 1937 |